United States Patent
Hui et al.

(10) Patent No.: US 7,742,152 B2
(45) Date of Patent: Jun. 22, 2010

(54) COHERENT DETECTION SCHEME FOR FM CHIRPED LASER RADAR

(75) Inventors: Rongqing Hui, Lawrence, KS (US); Christopher T. Allen, Lawrence, KS (US); Peter Adany, Overland Park, KS (US)

(73) Assignee: University of Kansas, Lawrence, KS (US)

(*) Notice: Subject to any disclaimer, the term of this patent is extended or adjusted under 35 U.S.C. 154(b) by 25 days.

(21) Appl. No.: 11/767,501

(22) Filed: Jun. 23, 2007

(65) Prior Publication Data

US 2008/0018881 A1    Jan. 24, 2008

Related U.S. Application Data

(60) Provisional application No. 60/805,677, filed on Jun. 23, 2006.

(51) Int. Cl.
*G01C 3/08* (2006.01)
(52) U.S. Cl. ................... 356/5.09; 356/5.1; 356/5.15
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 3,992,615 A * | 11/1976 | Bennett et al. | 356/5.11 |
| 5,642,194 A | 6/1997 | Erskine | |
| 5,745,437 A | 4/1998 | Wachter et al. | |
| 5,822,047 A | 10/1998 | Contarino et al. | |
| 5,910,839 A | 6/1999 | Erskine | |
| 6,608,669 B2 | 8/2003 | Holton | |
| 6,734,849 B2 | 5/2004 | Dimsdale et al. | |
| 7,145,713 B2 | 12/2006 | Chang et al. | |
| 7,148,469 B2 | 12/2006 | Pearson | |
| 7,170,440 B1 | 1/2007 | Beckner | |
| 7,391,506 B2 | 6/2008 | Harris et al. | |
| 2002/0071109 A1* | 6/2002 | Allen et al. | 356/5.01 |
| 2006/0203224 A1* | 9/2006 | Sebastian et al. | 356/4.09 |

* cited by examiner

*Primary Examiner*—Thomas H Tarcza
*Assistant Examiner*—Luke D Ratcliffe
(74) *Attorney, Agent, or Firm*—Schwegman, Lundberg & Woessner, P.A.

(57) ABSTRACT

An optical homodyne detection scheme for FM chirped lidar is described. The system performs de-chirping within a photodetector, and it does not require high-speed photo-detection or RF mixing. Embodiments are also described for dealing with phase noise.

20 Claims, 6 Drawing Sheets

Fig. 4. Example of de-chirped frequency measured with the simplified coherent detection Fig. 5. Comparison between measured and calculated SNR with coherent and direct detections

COHERENT DETECTION SCHEME FOR FM CHIRPED LASER RADAR

RELATED APPLICATIONS

This application is based upon, and claims priority to, previously filed provisional application Ser. No. 60/805,677, filed on Jun. 23, 2006. The provisional application is hereby incorporated by reference.

BACKGROUND

Lidar altimeters provide better range resolution and smaller beam size compared to conventional microwave radar systems. It is known that the range accuracy of a lidar system $\sigma_R$ depends on signal bandwidth B and the receiver signal-to-noise-ratio (SNR) as $\sigma_R \propto c/(B\sqrt{SNR})$, where c is the speed of light and signal bandwidth B is inversely proportional to the pulse width. In order to achieve acceptable range accuracy and detection sensitivity, satellite-based lidar systems generally operate in short pulse and high peak power regime with relatively low pulse repetition rate. In this case, photon damage has been a concern because megawatt level pulse peak power may cause damage to optical devices and therefore shorten the lifetime of the optical system.

DETAILED DESCRIPTION

Figures 1A, 1B:
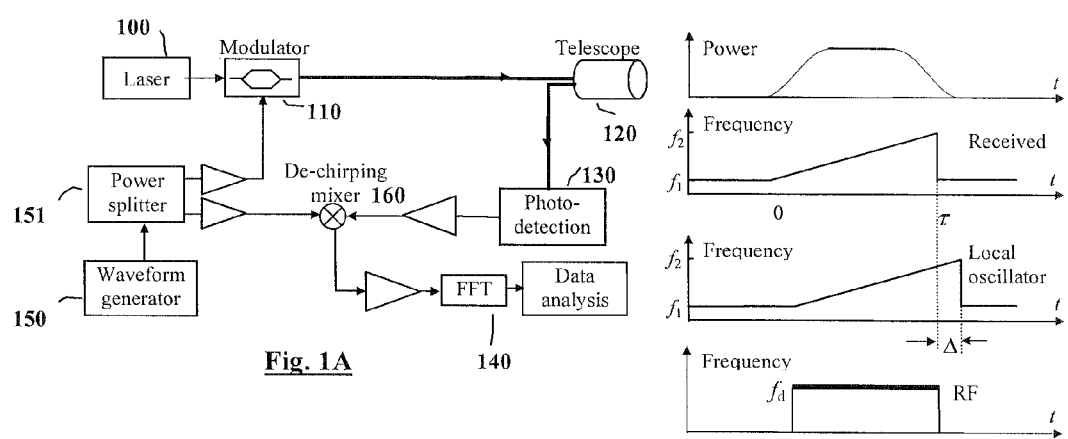
FIGS. 1A and 1B are a block diagram and waveform illustration, respectively, of FM chirped lidar with direct detection.

To overcome the problem of photon damage noted above, FM chirped lidar systems using long optical pulses with relatively low peak optical power have been demonstrated (See, e.g., A. L. Kachelmyer, "Range-Doppler imaging: waveforms and receiver design" *Laser Radar III*, R. J. Becherer Ed., Proceedings of SPIE, Vol. 999, pp. 138-161, 1988 and U.S. Patent Application Publication 20020071109, incorporated by reference. Illustrated in FIG. 1A is such a system that includes laser 100, modulator 110, telescope 120, photodetector 130, processing circuitry 140, waveform generator 150, power splitter 151, and de-chirping mixer 160. FIG. 1B illustrates the waveforms generated by the system. A linear frequency chirp is used to intensity modulate the optical pulses. The optical signal reflected from a target is converted into electrical signal by a photodiode, producing a delayed version of the chirped pulses. A comparison between this and the original chirp waveform at the de-chirping mixer converts the time delay $\Delta$ into a constant frequency $f_d=(f_2-f_1)\Delta/\tau$. Here the range accuracy depends on the chirp bandwidth $B=(f_2-f_1)$ rather than the pulse width $\tau$, and therefore excellent range accuracy can still be obtained with long optical pulses with low peak power.

Figure 2:
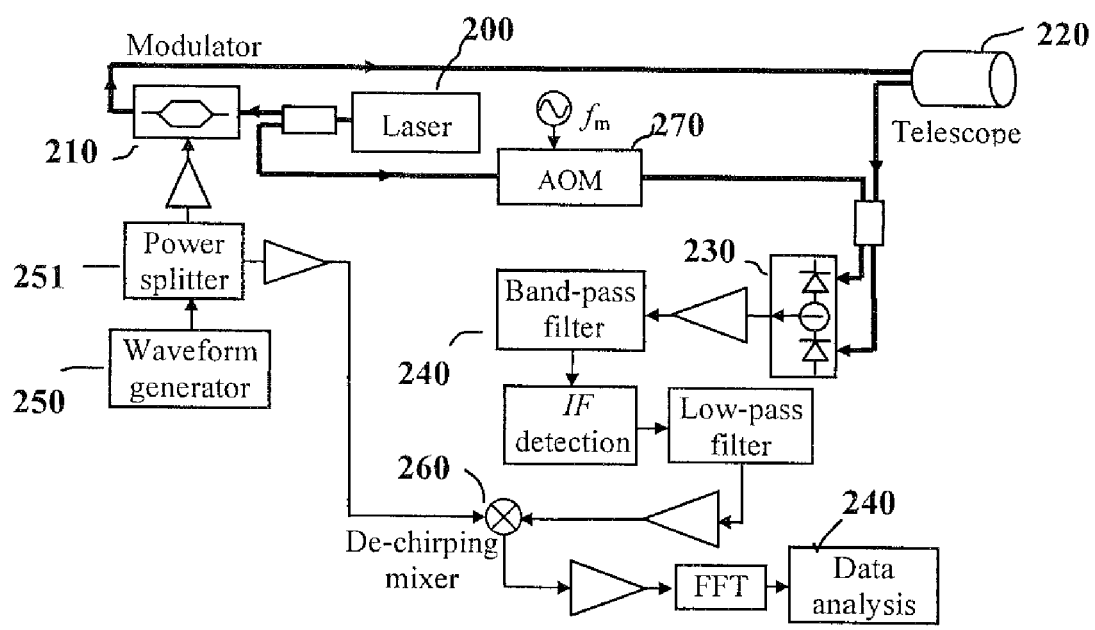
FIG. 2 is a block diagram of FM chirped lidar with direct detection

In lidar systems with direct detection, receiver SNR is dominated by thermal noise:

$$SNR_{dir} \approx \frac{R^2 m^2 \eta^2 P_{sig}^2}{4kTB_e/R_L} \quad (1)$$

where R is the responsivity of the photodiode, $R_L$ is the load resistance, k is Planck's constant, T is the absolute temperature, m is the optical modulation index, $\eta$ is the duty cycle of the optical pulse train and $P_{sig}$ is the average signal optical power received from the telescope. $B_e$ is the measurement electrical bandwidth. Although direct detection provides simple system architecture, the receiver SNR is degraded by 2 dB for each dB reduction of signal power. This is especially disadvantageous for long-range lidars where the received optical signal level is very low. In order to improve lidar receiver sensitivity, coherent detection can be used. (See, e.g., C. Allen, S. K. Chong, Y. Cobanoglu, S. Gogineni, "Development of a 1319 nm, Laser Radar using Fiber-Optics and RF Pulse Compression: Receiver Characterization," *Coherent Laser Radar Conference (CLCR '01)*; Great Malver, Worcesters, UK, July 2001.) FIG. 2 shows such a system that includes laser 200, modulator 110, telescope 220, balanced photodetector 230, processing circuitry 240, waveform generator 250, power splitter 251, de-chirping mixer 260, and acoustic-optic modulator 270. In this system the source laser is split into two parts; one of them is modulated by the FM chirp and fed to the telescope, while the other part is used as a local oscillator (LO) for coherent detection. An acousto-optic modulator (AOM) is used to shift the optical frequency by $f_m$ which serves as the IF frequency for heterodyne detection. A balanced photodiode rejects the direct detection component. The detected IF signal is selected by a bandpass filter and detected by a Schottky diode which recovers the baseband waveform. Then a de-chirping mixer compares this detected signal with the original chirp waveform and an FFT process is used to find the beating frequency. Coherent detection system significantly improved receiver SNR compared to direct detection, however, at the cost of greatly increased system complexity.

Figure 3:
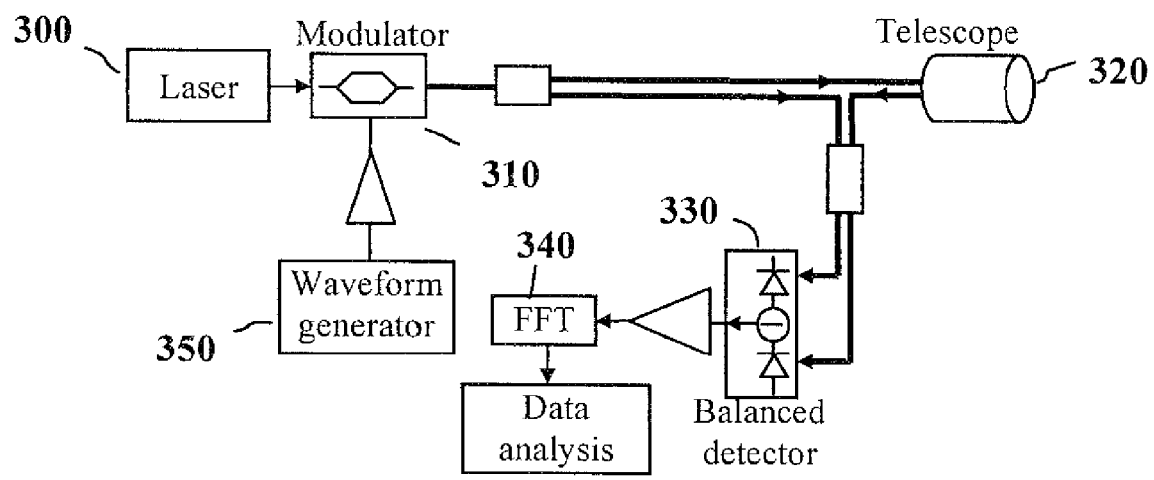
FIG. 3 is a block diagram of FM chirped lidar with a simplified coherent detection system.

Described herein is simplified homodyne coherent detection, a particular embodiment of which is shown schematically shown in FIG. 3. The system includes laser 300, modulator 310, telescope 320, balanced photodetector 330, processing circuitry 340, and waveform generator 350. In this system, both the optical signal and the LO are modulated by the same linear frequency chirp. The de-chirping process is accomplished within the photodiode and therefore eliminates the need of de-chirping mixing and the associated RF processing. The photocurrent signal obtained at the photodiode is:

$$I_{coh}(t) = \Re \eta \sqrt{P_{sig}P_{LO}} m^2 u(t)u(t-\Delta)\cos[\phi(t)] \quad (2)$$

Where u(t) is the chirped modulating waveform and $\phi(t)$ is the optical phase mismatch between the signal and the LO. Because the original chirp optical waveform, which is carried by the LO, beats with its delayed version at the photodiode as indicated in eq. (2), target distance can be directly obtained by a frequency analysis of the photocurrent signal. Considering that shot noise is the dominant noise with coherent detection, SNR at the beating frequency is approximately:

$$SNR_{coh} = \frac{\left(Rm\sqrt{P_{sig}P_{LO}}\right)^2}{2B_e RqP_{LO}} = \frac{m^2 R}{2B_e q} P_{sig} \quad (3)$$

Figure 4:
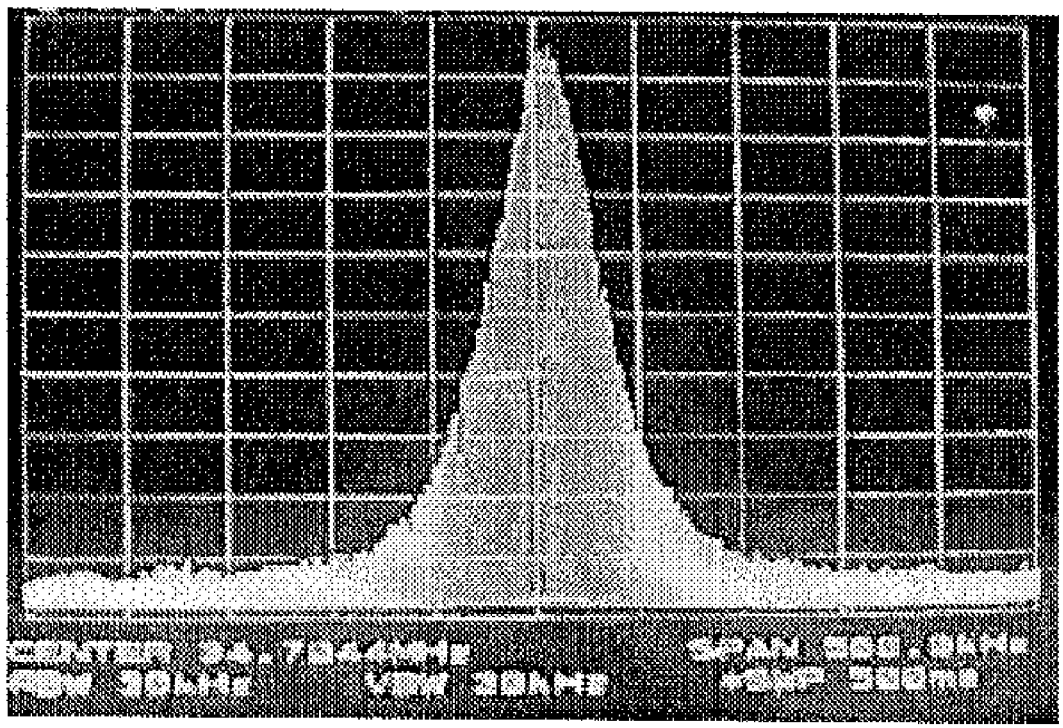
FIG. 4 shows an example of a de-chirped beating frequency.
Figure 5:
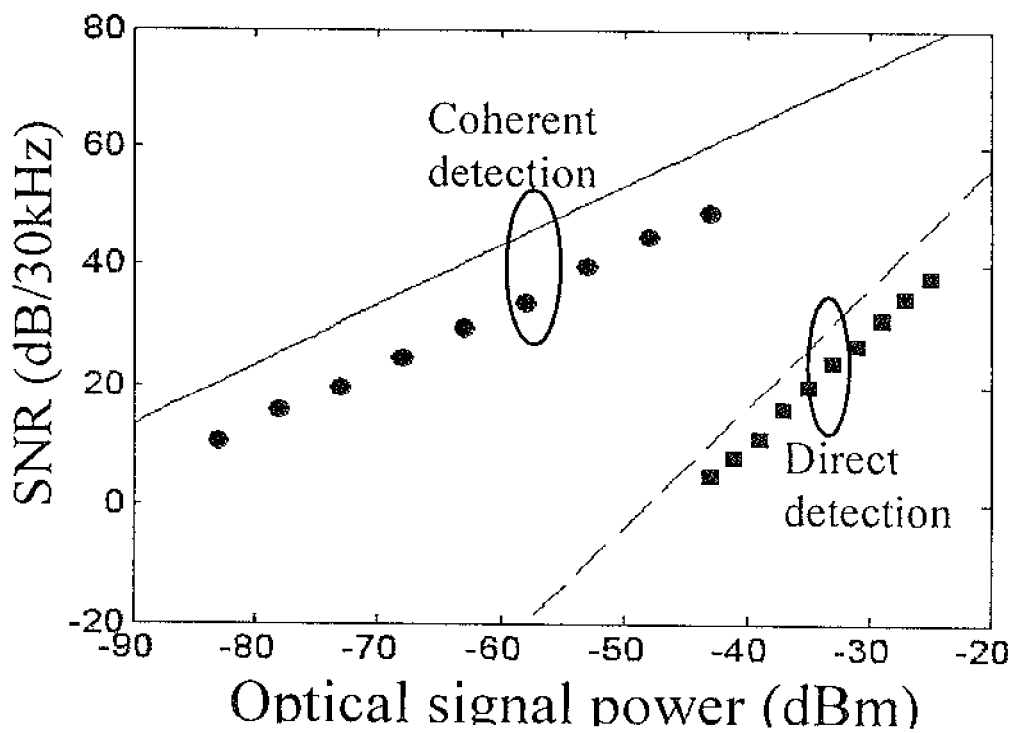
FIG. 5 shows an example of measured SNR versus signal optical power for both coherent detection and direct detection.

In order to demonstrate the concepts discussed above, lidar systems with both direct detection and simplified coherent detection were assembled. A diode pumped 1319 nm Nd:YAG laser was used as the source. The FM chirp was generated by an arbitrary waveform generator which is used to drive a Mach-Zehnder modulator with a modulation index of approximately 60%. The optical pulse width was 40 μs at a repetition rate of 8.7 kHz and therefore the duty cycle was approximately 35%. The modulation frequency was linearly chirped from 100 MHz to 200 MHz within each pulse, which produced a 2.5 MHz/μs chirping rate. A balanced photodiode with 800 MHz bandwidth was used as the detector. An RF spectrum analyzer was used to perform FFT. In order to avoid uncertainties of target reflectivity, a fiber-optic delay line was used to simulate the target delay. FIG. 4 shows an example of the de-chirped beating frequency, which was obtained with a target delay of 110.25 μs. A resolution bandwidth of 30 kHz was used in the spectrum analyzer. FIG. 5 shows the measured SNR versus signal optical power for both coherent detection (solid circles) and direct detection (squares). As expected, the SNR slope for coherent and direct detections are approximately 1 dB/dB and 2 dB/dB, respectively. Solid and dashed lines in FIG. 5 show the theoretical limits calculated with eq.s (1) and (3). The measured SNR for coherent detection is about 10 dB lower than the theoretical limit. It is believed that this discrepancy is introduced by random signal fading during the measurement due to laser phase noise.

Figure 6:
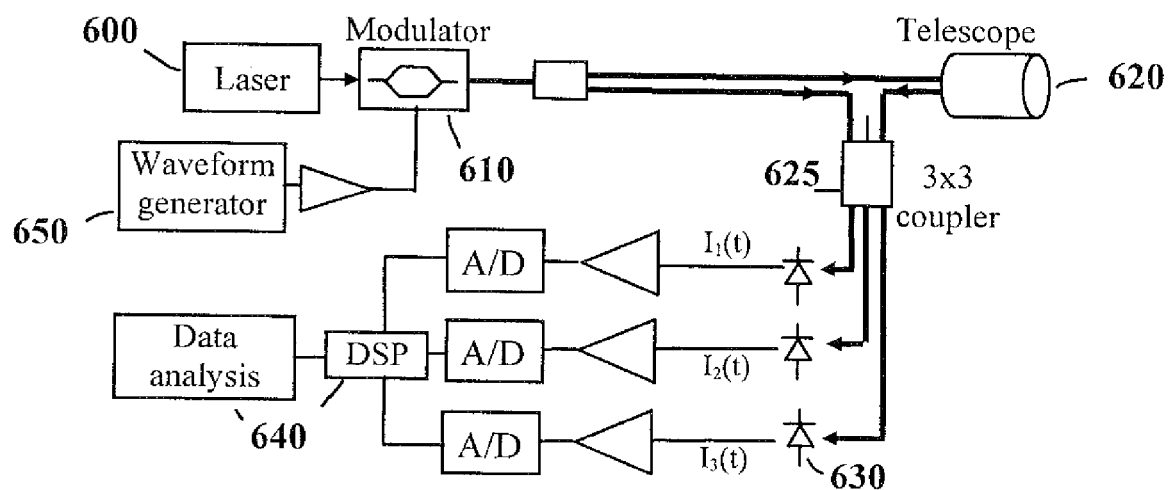
FIG. 6 illustrates an FM chirped lidar using coherent detection and phase diversity receiver and DSP to combat phase noise

Phase noise-induced signal fading is a common problem with homodyne detection, and it can be removed by using a phase diversity receiver. (See, e.g., A. W. Davis, M. J. Pettitt, J. P. King and S. Wright, "Phase diversity techniques for coherent optical receivers," *J. Lightwave Technologies*, Vol. 5, p. 561, 1987.) One efficient way to combat the phase noise-induced signal fading is to use phase diversity receiver and digital signal processing (DSP). An embodiment of a homodyne detection system that employs phase diversity reception is illustrated in FIG. 6. The system includes laser 600, modulator 610, telescope 620, photodetectors 630, processing circuitry 640, waveform generator 650, and 3×3 fiber coupler 625. The 3×3 fiber coupler is used to produce phase diversity. Because the phase difference between adjacent outputs of the coupler is 120°, the photo currents from the three detectors are:

$I_1(t) = P_{sig} + P_{LO} + 2\sqrt{P_{sig}P_{LO}}\cos\phi(t)$ $I_2(t) = P_{sig} + P_{LO} + 2\sqrt{P_{sig}P_{LO}}[\cos\phi(t) + 120°]$ $I_3(t) = P_{sig} + P_{LO} + 2\sqrt{P_{sig}P_{LO}}[\cos\phi(t) + 240°]$ These three photocurrent components can be amplified and individually digitalized. Then a simple DSP algorithm can be used to remove the phase noise effect.

An alternative way of dealing with phase noise is to use a specially designed 3×3 fiber coupler but only 2 input and 2 output ports are used. By carefully selecting the coupling coefficient, the phase difference between two of the two outputs can be 90 degree (instead of 180 degree for conventional 2×2 fiber couplers). Therefore the photo currents from the two detectors are:

$I_1(t) = P_{sig} + P_{LO} + 2\sqrt{P_{sig}P_{LO}}\cos\phi(t)$ $I_2(t) = P_{sig} + P_{LO} - 2\sqrt{P_{sig}P_{LO}}\sin\phi(t)$ In this case the signal components can be extracted easily by squaring and adding these two photocurrents.

As has been described above with reference to specific embodiments, an apparatus for determining the distance to an object includes a laser for generating a laser pulse and a modulator for intensity modulating the laser pulse with a chirp waveform u(t) having a frequency that varies linearly with time within the pulse. In one embodiment, the laser operates in a continuous wave mode, and the modulator intensity modulates the laser output into repetitive pulses with a chirp waveform having a frequency that varies linearly with time within each pulse. A beamsplitter splits the modulated laser pulse into an optical transmit signal that is transmitted to the object and an optical local oscillator signal. The apparatus receives the optical transmit signal backscattered from the object through an optical system such as a telescope that may also be used for transmitting the optical transmit signal. By various means, the difference in frequency between the modulating chirp waveform u(t) of the optical local oscillator signal and the modulating chirp waveform u(t−Δ) of the backscattered optical transmit signal as delayed by the transit time Δ in traveling to and from the object is then detected. The apparatus then further includes processing circuitry for deriving the value of the transit time Δ of the backscattered optical transmit signal from the detected frequency difference and computing the distance to the object therefrom.

In one particular embodiment, the frequency difference between u(t) and u(t−Δ) is determined using a photodetector for mixing the backscattered optical transmit signal and the optical local oscillator signal to produce an electrical signal I(t) that includes a u(t)u(t−Δ) component representing u(t) mixed with u(t−Δ) as approximated by:

$$I(t) = m^2 u^2(t)P_{sig} + m^2 u^2(t-\Delta)P_{LO} + 2\sqrt{P_{sig}P_{LO}}\, m^2 u(t)u(t-\Delta)\cos\varphi(t)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal. (Certain proportionality constants have been omitted.) Signal processing circuitry then filters the I(t) signal to extract the u(t)u(t−Δ) component and detects the frequency difference between u(t) and u(t−Δ) from the beat frequency of the u(t)(t−Δ) component.

In another embodiment, the frequency difference between u(t) and u(t−Δ) is determined using a balanced photodetector for mixing the backscattered optical transmit signal and the optical local oscillator signal to produce an electrical signal I(t) that includes a u(t)u(t−Δ) component representing u(t) mixed with u(t−Δ) as approximated by:

$I(t) = 2\sqrt{P_{sig}P_{LO}}\, m^2 u(t)u(t-\Delta)\cos\phi(t)$

Signal processing circuitry then detects the frequency difference between u(t) and u(t−Δ) from the beat frequency of the u(t)u(t−Δ) component.

In another embodiment, the frequency difference between u(t) and u(t−Δ) is determined using an optical coupler that produces two outputs having a 90 degree phase difference relative to one another for passing the backscattered optical transmit signal and the optical local oscillator signal therethrough. First and second photodetectors mix the two outputs of the optical coupler to produce respective current signals $I_1(t)$ and $I_2(t)$ that each include a $u(t)u(t-\Delta)$ component representing $u(t)$ mixed with $u(t-\Delta)$ as approximated by:

$$I_1(t) = m^2u^2(t)P_{sig} + m^2u^2(t-\Delta)P_{LO} + 2\sqrt{P_{sig}P_{LO}}\, m^2u(t)u(t-\Delta)\cos\varphi(t)$$

$$I_2(t) = m^2u^2(t)P_{sig} + m^2u^2(t-\Delta)P_{LO} + 2\sqrt{P_{sig}P_{LO}}\, m^2u(t)u(t-\Delta)\sin\varphi(t)$$

Signal processing circuitry then filters the $I_1(t)$ and $I_2(t)$ signals to extract the $u(t)(t-\Delta)$ components therefrom, combines the filtered $I_1(t)$ and $I_2(t)$ signals in a manner that removes the dependency upon $\cos\phi(t)$ and $\sin\phi(t)$ terms representing phase noise, and detects the frequency difference between $u(t)$ and $u(t-\Delta)$ from the beat frequency of the $u(t)u(t-\Delta)$ component of the combined and filtered $I_1(t)$ and $I_2(t)$ signals.

In another embodiment, the frequency difference between $u(t)$ and $u(t-\Delta)$ is determined using an optical coupler that produces N outputs that are successively separated in phase by a phase difference K for passing the backscattered optical transmit signal and the optical local oscillator signal therethrough. For example, the optical coupler may produce three outputs separated from one another by a phase difference of 120 degrees. N photodetectors mix the N outputs of the optical coupler to produce current signals $I_n(t)$ for n=1 through N that each include a $u(t)u(t-\Delta)$ component representing $u(t)$ mixed with $u(t-\Delta)$ as approximated by:

$$I_n(t) = m^2u^2(t)P_{sig} + m^2u^2(t-\Delta)P_{LO} + 2\sqrt{P_{sig}P_{LO}}\, m^2u(t)u(t-\Delta)(\cos\varphi(t)+nK)$$

Signal processing circuitry then filters the $I_n(t)$ signals to extract the $u(t)(t-\Delta)$ components therefrom, combines the filtered $I_n(t)$ signals in a manner that removes the dependency upon the $\cos\phi(t)+nK$ terms representing phase noise, and detects the frequency difference between $u(t)$ and $u(t-\Delta)$ from the beat frequency of the $u(t)u(t-\Delta)$ component of the combined and filtered $I_n(t)$ signals.

Many alternatives exist for the specific components and operating parameters of any of the embodiments described above. An exemplary modulator is a Mach-Zehnder modulator driven by a waveform generator. The laser may be intensity modulated to generate an optical pulse train with any appropriate pulse width and repetition rate, specific examples being approximately 40 µs and 8.7 kHz, respectively. The modulator may be configured to operate such that the frequency of the chirp waveform varies over any frequency range found to be suitable for the particular apparatus and operating parameters, a specific example being approximately 100 MHz to 200 MHz within the laser pulse, and such that the optical modulation index m is any value that produces a modulated optical signal capable of being demodulated by the particular apparatus, a specific example of which is approximately 60%.

A simplified optical homodyne detection scheme for FM chirped lidar has been described where dechirping is performed within the photodetector. In addition to its simplicity, another advantage of the self-homodyne detection is that it does not require high-speed photo-detection, RF mixing and the associated amplifiers. This allows the use of wide chirping bandwidth to achieve high range accuracy.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method for determining the distance to an object, comprising:
   intensity modulating a laser pulse with a chirp waveform $u(t)$ having a frequency that varies linearly with time;
   splitting the modulated laser pulse into an optical transmit signal that is transmitted to the object and an optical local oscillator signal;
   receiving the optical transmit signal backscattered from the object; and,
   mixing the backscattered optical transmit signal and the optical local oscillator signal and detecting the difference in frequency between the modulating chirp waveform $u(t)$ of the optical local oscillator signal and the modulating chirp waveform $u(t-\Delta)$ of the backscattered optical transmit signal as delayed by the transit time $\Delta$ in traveling to and from the object; and
   deriving the value of the transit time $\Delta$ of the backscattered optical transmit signal from the detected frequency difference and computing the distance to the object therefrom.

2. The method of claim 1 further comprising detecting the frequency difference between $u(t)$ and $u(t-\Delta)$ by:
   mixing the backscattered optical transmit signal and the optical local oscillator signal with a photodetector to produce an electrical signal $I(t)$ that includes a $u(t)u(t-\Delta)$ component representing $u(t)$ mixed with $u(t-\Delta)$ as approximated by:

$$I(t) = m^2u^2(t)P_{sig} + m^2u^2(t-\Delta)P_{LO} + 2\sqrt{P_{sig}P_{LO}}\, m^2u(t)u(t-\Delta)\cos\varphi(t)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal;
   filtering the $I(t)$ signal to extract the $u(t)u(t-\Delta)$ component; and,
   detecting the frequency difference between $u(t)$ and $u(t-\Delta)$ from the beat frequency of the $u(t)u(t-\Delta)$ component.

3. The method of claim 1 further comprising detecting the frequency difference between $u(t)$ and $u(t-\Delta)$ by:
   mixing the backscattered optical transmit signal and the optical local oscillator signal with a balanced photodetector to produce an electrical signal $I(t)$ that includes a $u(t)u(t-\Delta)$ component representing $u(t)$ mixed with $u(t-\Delta)$ as approximated by:

$$I(t) = 2\sqrt{P_{sig}P_{LO}}\, m^2u(t)u(t-\Delta)\cos\varphi(t)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal; and, detecting the frequency difference between u(t) and u(t−Δ) from the beat frequency of the u(t)u(t−Δ) component.

4. The method of claim 1 further comprising detecting the frequency difference between u(t) and u(t−Δ) by:

passing the backscattered optical transmit signal and the optical local oscillator signal through an optical coupler that produces two outputs having a 90 degree phase difference relative to one another;

mixing the two outputs of the optical coupler with first and second photodetectors to produce respective current signals $I_1(t)$ and $I_2(t)$ that each include a u(t)u(t−Δ) component representing u(t) mixed with u(t−Δ) as approximated by:

$$I_1(t) = m^2 u^2(t) P_{sig} + m^2 u^2(t-\Delta) P_{LO} + 2\sqrt{P_{sig}P_{LO}}\, m^2 u(t)u(t-\Delta)\cos\varphi(t)$$

$$I_2(t) = m^2 u^2(t) P_{sig} + m^2 u^2(t-\Delta) P_{LO} + 2\sqrt{P_{sig}P_{LO}}\, m^2 u(t)u(t-\Delta)\sin\varphi(t)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal;

filtering the $I_1(t)$ and $I_2(t)$ signals to the extract the u(t)u(t−Δ) components therefrom;

combining the filtered $I_1(t)$ and $I_2(t)$ signals in a manner that removes the dependency upon cos $\phi(t)$ and sin $\phi(t)$ terms representing phase noise; and, detecting the frequency difference between u(t) and u(t−Δ) from the beat frequency of the u(t)u(t−Δ) component of the combined and filtered $I_1(t)$ and $I_2(t)$ signals.

5. The method of claim 1 further comprising detecting the frequency difference between u(t) and u(t−Δ) by:

passing the backscattered optical transmit signal and the optical local oscillator signal through an optical coupler that produces N outputs that are successively separated in phase by a phase difference K;

mixing the N outputs of the optical coupler with N photodetectors to produce current signals $I_n(t)$ for n=1 through N that each include a u(t)(t−Δ) component representing u(t) mixed with u(t−Δ) as approximated by:

$$I_n(t) = m^2 u^2(t) P_{sig} + m^2 u^2(t-\Delta) P_{LO} + 2\sqrt{P_{sig}P_{LO}}\, m^2 u(t)u(t-\Delta)(\cos\varphi(t)+nK)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal;

filtering the $I_n(t)$ signals to the extract the u(t)u(t−Δ) components therefrom;

combining the filtered $I_n(t)$ signals in a manner that removes the dependency upon the cos $\phi(t)$+nK terms representing phase noise; and, detecting the frequency difference between u(t) and u(t−Δ) from the beat frequency of the u(t)u(t−Δ) component of the combined and filtered $I_n(t)$ signals.

6. The method of claim 5 wherein N is equal to 3 and K is equal to 120 degrees.

7. The method of claim 1 wherein the modulation of the laser pulse with the chirp waveform u(t) is performed with a Mach-Zehnder modulator driven by a waveform generator.

8. The method of claim 1 wherein the pulse width of the laser pulse is approximately 40 μs at a repetition rate of approximately 8.7 kHz.

9. The method of claim 1 wherein the frequency of the chirp waveform varies from approximately 100 MHz to 200 MHz within the laser pulse.

10. The method of claim 2 wherein the optical modulation index m is approximately 60%.

11. An apparatus for determining the distance to an object, comprising:

a laser;

a modulator for intensity modulating the output of the laser into one or more laser pulses and modulating each laser pulse with a chirp waveform u(t) having a frequency that varies linearly with time;

a beamsplitter for splitting the modulated laser pulse into an optical transmit signal that is transmitted to the object and an optical local oscillator signal;

an optical receiver for receiving the optical transmit signal backscattered from the object; and, means for mixing the backscattered optical transmit signal and the optical local oscillator signal and detecting the difference in frequency between the modulating chirp waveform u(t) of the optical local oscillator signal and the modulating chirp waveform u(t−Δ) of the backscattered optical transmit signal as delayed by the transit time Δ in traveling to and from the object; and processing circuitry for deriving the value of the transit time Δ of the backscattered optical transmit signal from the detected frequency difference and computing the distance to the object therefrom.

12. The apparatus of claim 11 wherein the means for detecting the frequency difference between u(t) and u(t−Δ) comprises:

a non-linear photodetector for mixing the backscattered optical transmit signal and the optical local oscillator signal to produce an electrical signal I(t) that includes a u(t)u(t−Δ) component representing u(t) mixed with u(t−Δ) as approximated by:

$$I(t) = m^2 u^2(t) P_{sig} + m^2 u^2(t-\Delta) P_{LO} + 2\sqrt{P_{sig}P_{LO}}\, m^2 u(t)u(t-\Delta)\cos\varphi(t)$$

where m is the optical modulation index, $P_{sig}$ is the average power of the backscattered optical transmit signal, $P_{LO}$ is the average power of the optical local oscillator signal, and $\phi(t)$ is the optical phase mismatch between the backscattered optical transmit signal and the optical local oscillator signal;

signal processing circuitry for filtering the I(t) signal to extract the u(t)u(t−Δ) component and for detecting the frequency difference between u(t) and u(t−Δ) from the beat frequency of the u(t)u(t−Δ) component.

13. The apparatus of claim 11 wherein the means for detecting the frequency difference between u(t) and u(t−Δ) comprises:

a balanced photodetector for mixing the backscattered optical transmit signal and the optical local oscillator signal to produce an electrical signal I(t) that includes a u(t)u(t−Δ) component representing u(t) mixed with u(t−Δ) as approximated by:

$$I(t) = 2\sqrt{P_{sig}P_{LO}}\,m^2 u(t)u(t-\Delta)\cos\varphi(t)$$

where m is the optical modulation index, $P_{sig}$ is the average power of the backscattered optical transmit signal, $P_{LO}$ is the average power of the optical local oscillator signal, and φ(t) is the optical phase mismatch between the backscattered optical transmit signal and the optical local oscillator signal; and, signal processing circuitry for detecting the frequency difference between u(t) and u(t−Δ) from the beat frequency of the u(t)u(t−Δ) component.

14. The apparatus of claim 11 wherein the means for detecting the frequency difference between u(t) and u(t−Δ) comprises:

an optical coupler that produces two outputs having a 90 degree phase difference relative to one another for passing the backscattered optical transmit signal and the optical local oscillator signal therethrough;

first and second photodetectors for mixing the two outputs of the optical coupler to produce respective current signals $I_1(t)$ and $I_2(t)$ that each include a u(t)u(t−Δ) component representing u(t) mixed with u(t−Δ) as approximated by:

$$I_1(t) = m^2 u^2(t)P_{sig} + m^2 u^2(t-\Delta)P_{LO} + 2\sqrt{P_{sig}P_{LO}}\,m^2 u(t)u(t-\Delta)\cos\varphi(t)$$

$$I_2(t) = m^2 u^2(t)P_{sig} + m^2 u^2(t-\Delta)P_{LO} + 2\sqrt{P_{sig}P_{LO}}\,m^2 u(t)u(t-\Delta)\sin\varphi(t)$$

where m is the optical modulation index, $P_{sig}$ is the average power of the backscattered optical transmit signal, $P_{LO}$ is the average power of the optical local oscillator signal, and φ(t) is the optical phase mismatch between the backscattered optical transmit signal and the optical local oscillator signal;

signal processing circuitry for filtering the $I_1(t)$ and $I_2(t)$ signals to the extract the u(t)u(t−Δ) components therefrom, for combining the filtered $I_1(t)$ and $I_2(t)$ signals in a manner that removes the dependency upon cos φ(t) and sin φ(t) terms representing phase noise, and for detecting the frequency difference between u(t) and u(t−Δ) from the beat frequency of the u(t)u(t−Δ) component of the combined and filtered $I_1(t)$ and $I_2(t)$ signals.

15. The apparatus of claim 11 wherein the means for detecting the frequency difference between u(t) and u(t−Δ) comprises:

an optical coupler that produces N outputs that are successively separated in phase by a phase difference K for passing the backscattered optical transmit signal and the optical local oscillator signal therethrough;

N photodetectors for mixing the N outputs of the optical coupler to produce current signals $I_n(t)$ for n=1 through N that each include a u(t)u(t−Δ) component representing u(t) mixed with u(t−Δ) as approximated by:

$$I_n(t) = m^2 u^2(t)P_{sig} + m^2 u^2(t-\Delta)P_{LO} + 2\sqrt{P_{sig}P_{LO}}\,m^2 u(t)u(t-\Delta)(\cos\varphi(t)+nK)$$

where m is the optical modulation index, $P_{sig}$ is the average power of the backscattered optical transmit signal, $P_{LO}$ is the average power of the optical local oscillator signal, and φ(t) is the optical phase mismatch between the backscattered optical transmit signal and the optical local oscillator signal;

signal processing circuitry for filtering the $I_n(t)$ signals to the extract the u(t)u(t−Δ) components therefrom, for combining the filtered $I_n(t)$ signals in a manner that removes the dependency upon the cos φ(t)+nK terms representing phase noise, and for detecting the frequency difference between u(t) and u(t−Δ) from the beat frequency of the u(t)u(t−Δ) component of the combined and filtered $I_n(t)$ signals.

16. The apparatus of claim 15 wherein N is equal to 3 and K is equal to 120 degrees.

17. The apparatus of claim 11 wherein the modulator is a Mach-Zehnder modulator driven by a waveform generator.

18. The apparatus of claim 11 wherein the laser is configured to generate a laser pulse with a pulse width of approximately 40 μs at a repetition rate of approximately 8.7 kHz.

19. The apparatus of claim 11 wherein the modulator is configured to operate such that the frequency of the chirp waveform varies from approximately 100 MHz to 200 MHz within the laser pulse.

20. The apparatus of claim 12 wherein the optical modulation index m is approximately 60%.

* * * * *